Patented Oct. 1, 1929

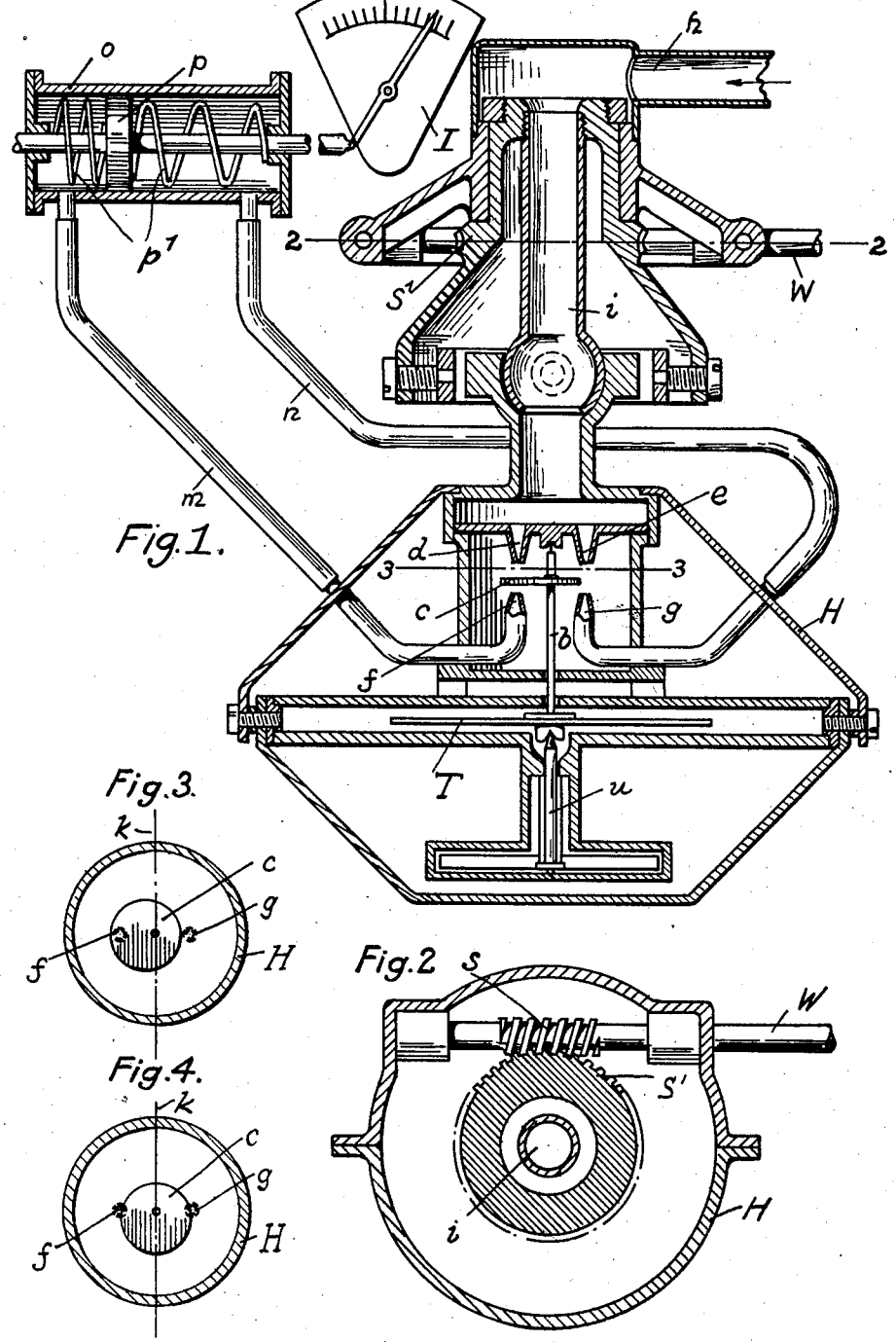

1,729,850

UNITED STATES PATENT OFFICE

GUIDO WÜNSCH, OF STEGLITZ, NEAR BERLIN, GERMANY, ASSIGNOR TO ASKANIA-WERKE A.-G. VORMALS CENTRALWERKSTATT DESSAU UND CARL BAMBERG-FRIEDENAU, OF BERLIN-FRIEDENAU, GERMANY, A CORPORATION OF GERMANY

STEERING INDICATOR FOR AIRCRAFT

Application filed March 21, 1928, Serial No. 263,518, and in Germany March 28, 1927.

It is already known in the case of aircraft with a crew of two or more persons, to detail the observation work to an observer. In order to facilitate communication with the pilot, it has been proposed to have the observer turn the casing of the compass watched by the pilot, in which case a direction indicator is automatically operated, which remains operative until the pilot, by a corresponding steering, turns the aircraft in the direction desired by the observer. The arrangement is preferably done in such a manner that the observer sets a pointer adjustable in front of a compass card and positively connected to the compass casing, so that it turns the latter to the same amount in the opposite direction. The operation of the direction indicator is preferably done electrically, namely the magnetic needle, or an arm secured to it, is arranged between two casing contacts, so that when on deviating to one or the other direction, it closes one of two circuits and in that way operates an electromagnetic direction indicator.

The drawback of this arrangement is that the closing of the electric contacts is not a perfect one, as the directional force of the magnetic needle is too small, and owing to constant vibrations during the flying, a good contact of the needle or of the arm secured to it, with the contact of the casing cannot be obtained. For that reason, it has been already proposed also to effect the control or steering by means of selenium cells, but this kind of control presents difficulties and is unreliable.

The present invention eliminates the drawback in question by using as the source of power a pressure medium (for instance compressed air) acting on a servo-motor and throttled to a greater or less extent by the movement of the compass casing relatively to the magnet system.

A construction according to the invention is illustrated by way of example in the accompanying drawing in which Figure 1 is a vertical section through the compass, Figure 2 is a section of Figure 1 on line 2—2, and Figures 3 and 4 are sections on line 3—3 showing two positions of the apparatus.

The casing of the compass T is marked H. It is mounted in a rotatable manner. The rotation can be effected by means of a spindle W which is turned by the observer in the known manner, for instance by his setting a pointer on a compass card arranged in front of his seat. The spindle W carries a worm S which is in mesh with the worm rim or wheel $S^1$ mounted on the compass casing.

The compass itself can be of any desired construction. In the construction shown in the drawing, the magnets are mounted on a point or pin $a$. To the oscillating magnet system, or to the card, is secured a spindle $b$ projecting upwards, and bearing an eccentrically mounted disc $c$. Above and below the disc $c$ are respectively arranged pairs of nozzles or mouthpieces $d$, $e$, $f$, and $g$. The nozzles $d$ and $e$ lead into a hollow space in the upper part of the compass, to which a pressure medium, preferably compressed air, is supplied through a pipe $h$. The compressed air passes through the pipe $i$ and constantly escapes through the two nozzle shaped parts $d$ and $e$.

The energy of flow of the two escaping jets is determined by the nozzles $f$ and $g$. A pressure difference gauge of the well known kind, connected to these nozzles, will be in the zero position when the energy of flow is the same. In the path of the two jets is arranged the disc $c$, controlled by the magnet system. In the normal position, that is to say when the aircraft has taken the prescribed direction, the action of the throttling pressure of each of the two air jets on the nozzles $f$ and $g$ is reduced by the disc $d$ to about half the value it would otherwise have (Figure 4).

When the aircraft deviates from its course, the disc $c$ will tend to assume for instance the position shown in Figure 3. The throttling pressure on the nozzle $g$ will be increased, that on the nozzle $f$ decreased, until in the position shown in Figure 3, the throttling pressure on the nozzle $g$ will indicate the full energy of flow of the jet escaping from the nozzle, while the action of the jet escaping from the nozzle $d$, on the nozzle $f$ will become zero. The pressure difference gauge connected to the nozzles *f* and *g* will have reached its greatest possible deflection.

In the arrangement illustrated and described, the reaction forces of the air jets will also cancel each other in the normal position of the aircraft, as the torques acting on the eccentric disc *c* will be of the same value and of the opposite direction in the said position.

The nozzles *f* and *g* are connected by pipes *m* and *n* to the two ends of a cylinder *o* in which travels a piston *p*. When the compressed air can enter but one of the nozzles *f* or *g* an excess of pressure will be produced in the corresponding cylinder end, and the piston *p* will be moved accordingly in one or in the other direction. The movement of the piston can be utilized either for setting a direction indicator I which informs the pilot in which direction he has to steer, or for effecting the steering automatically.

As soon as the pilot has turned in the direction desired by the observer the compass casing will again have turned back relatively to the disc *c* to such an extent that both nozzles will be partially covered, whereupon the piston will be brought back again to its central position by any desired means, for instance by two weak springs $p^1$ of the same power acting on the two faces of the piston, so that the direction indicator will cease to act. The piston could be used of course also directly for the steering of the aircraft, as with a suitable dimensioning of the nozzles, of the air pressure etc. sufficiently large forces can be produced in order to bring about by means of the piston itself the steering movements, for instance a twisting of the pressure surfaces, so that the driver himself need not do anything for turning the aircraft to the proper course.

It goes without saying that the construction shown in the drawing can be modified in many respects. Thus for instance the arrangement can be used in the same way for a fluid compass. In place of the servomotor constituted by the piston and cylinder, a diaphragm can be used which is moved by the varying pressure to one or to the other side, and the eccentric disc used for the throttling of the pressure medium could be replaced by a cylinder segment, in which case the nozzles would have to be arranged radially of the axis of the magnet system, that is to say, turned to 90° relatively to the position shown in the drawing. The outlet openings *d* and *e* for the pressure medium can also be connected directly to the pipes *m* and *n* by inserting other throttling devices, for instance valves, cocks or the like, which are adjusted to suit the position of the compass casing relatively to the magnet needle, but in such cases the overcoming of the relatively great friction will probably present great difficulties.

The arrangements for the turning of the casing can be any desired. In place of mechanical ones could be used electric or hydraulic devices.

If required, separate means can be provided for intensifying the pressure produced by the device behind the piston, in order to obtain a sufficient setting force, more particularly when the apparatus is to be used for automatic steering.

Both actions can be of course combined, that is to say, a direction indicator which is visible to the pilot could be operated, and at the same time the steering automatically effected.

As a rule, two nozzles will be used and two compressed air pipes in order to produce a movement of the servomotor in two directions, but in certain cases it may be sufficient to use one pipe, or necessary to use more than two pipes, for instance when, according to the different setting, different signals are to be given or different actions are automatically to be performed.

I claim:

1. A steering indicator for aircraft comprising a rotatable compass casing, means for rotating said casing according to the direction to be followed, a nozzle in said casing, means for conducting a fluid under pressure to said nozzle, a second nozzle positioned opposite to and adapted to receive at least a part of the flow from said first nozzle, a compass needle in said casing, and means interposed between said nozzles and controlled by said needle adapted to vary the proportion of fluid exchanged between said nozzles.

2. A steering indicator for aircraft comprising a rotatable compass casing, means for rotating said casing according to the direction to be followed, a pair of nozzles in said casing, means for conducting a fluid under pressure to said nozzles, a second pair of nozzles positioned opposite to and adapted to receive at least a part of the flow from said first pair of nozzles respectively, a compass needle in said casing, and means interposed between said nozzles and controlled by said needle adapted to vary the proportion of fluid exchanged between said nozzles.

3. A steering indicator for aircraft comprising a rotatable compass casing, means for rotating said casing according to the direction to be followed, a nozzle in said casing, means for conducting a fluid under pressure to said nozzle, a second nozzle positioned opposite to and adapted to receive at least a part of the flow from said first nozzle, a compass needle in said casing, means interposed between said nozzles and controlled by said needle adapted to vary the proportion of fluid exchanged between said nozzles and indicating means adapted to be controlled by the fluid received by the second nozzle.

4. A steering indicator for aircraft comprising a rotatable compass casing, means for rotating said casing according to the direction to be followed, a pair of nozzles in said casing, means for conducting a fluid under pressure to said nozzles, a second pair of nozzles positioned opposite to and adapted to receive at least a part of the flow from said first pair of nozzles respectively, a compass needle in said casing, means interposed between said nozzles and controlled by said needle adapted to vary the proportion of fluid exchanged between said nozzles and indicating means adapted to be controlled by the difference of fluid pressure in the second pair of nozzles.

5. A steering indicator for aircraft comprising a rotatable compass casing, means for rotating said casing according to the direction to be followed, a nozzle in said casing, means for conducting a fluid under pressure to said nozzle, a second nozzle positioned opposite to and adapted to receive at least a part of the flow from said first nozzle, a compass needle in said casing, and an eccentric disc rotating with the compass needle interposed between said nozzles and controlled by said needle adapted to vary the proportion of fluid exchanged between said nozzles.

6. A steering indicator for aircraft comprising a rotatable compass casing, means for rotating said casing according to the direction to be followed, a pair of nozzles in said casing, means for conducting a fluid under pressure to said nozzles, a second pair of nozzles positioned opposite to and adapted to receive at least a part of the flow from said first pair of nozzles respectively, a compass needle in said casing, and an eccentric disc rotating with the compass needle interposed between said nozzles and controlled by said needle adapted to vary the proportion of fluid exchanged between said nozzles.

In testimony whereof I have affixed my signature.

GUIDO WÜNSCH.